United States Patent
Panzner et al.

(10) Patent No.: US 9,789,666 B2
(45) Date of Patent: Oct. 17, 2017

(54) BULLET RESISTANT LAMINATED GLASS

(71) Applicant: SCHOTT AG, Mainz (DE)

(72) Inventors: Gerrit Panzner, Rudolstadt (DE); Ruediger Freitag, Etterwinden (DE); Georg Neupert, Jena-Drackendorf (DE); Gerhard Lautenschlaeger, Jena (DE)

(73) Assignee: SCHOTT AG, Mainz (DE)

( * ) Notice: Subject to any disclaimer, the term of this patent is extended or adjusted under 35 U.S.C. 154(b) by 126 days.

(21) Appl. No.: 14/412,955

(22) PCT Filed: Jun. 12, 2013

(86) PCT No.: PCT/EP2013/062149
§ 371 (c)(1),
(2) Date: Jan. 5, 2015

(87) PCT Pub. No.: WO2014/005813
PCT Pub. Date: Jan. 9, 2014

(65) Prior Publication Data
US 2015/0165730 A1     Jun. 18, 2015

(30) Foreign Application Priority Data
Jul. 3, 2012 (DE) .......................... 10 2012 105 900

(51) Int. Cl.
*B32B 17/10* (2006.01)
*F41H 5/04* (2006.01)

(52) U.S. Cl.
CPC .. *B32B 17/10045* (2013.01); *B32B 17/10082* (2013.01); *B32B 17/10091* (2013.01);
(Continued)

(58) Field of Classification Search
CPC .................. C03C 3/076–3/118; F41H 5/0407
See application file for complete search history.

(56) References Cited

U.S. PATENT DOCUMENTS 3,930,452 A * 1/1976 Van Laethem ... B32B 17/10045
                                                                109/49.5
4,595,624 A * 6/1986 Greathead ......... B32B 17/10045
                                                                428/213
(Continued)

FOREIGN PATENT DOCUMENTS

CO    WO 03068501 A1 * 8/2003  ....... B32B 17/10045
DE       9317460 U1     2/1994
(Continued)

OTHER PUBLICATIONS

Zhang et al. "The mechanical properties of ionoplast interlayer material at high strain rates". Materials & Design, vol. 83, (2015); pp. 387-399.*

(Continued)

*Primary Examiner* — Prashant J Khatri
(74) *Attorney, Agent, or Firm* — Ohlandt, Greeley, Ruggiero & Perle, L.L.P.

(57) ABSTRACT

The present disclosure relates to bullet-resistant laminated glass having at least three sheets of glass. One of the sheets of glass faces the impact side as a cover sheet, and one sheet of glass is formed as a closure sheet facing away from the impact side. Between the cover sheet and the closure sheet, one or more intermediate sheets are disposed, these sheets of glass being connected to each other by composite layers. The composite layers are formed by flexible and dimensionally unstable films and/or cast compounds. The composite layers do not consist of polycarbonate, polyurethane or polymethylmethacrylate. In order to prevent splinter output on the rear side, this glass composite has a closure sheet on the rear side consisting of thermally or chemically pre-stressed glass.

18 Claims, 2 Drawing Sheets

(52) U.S. Cl.
CPC .. *B32B 17/10119* (2013.01); *B32B 17/10137* (2013.01); *B32B 17/10165* (2013.01); *B32B 17/10761* (2013.01); *F41H 5/0407* (2013.01); *B32B 2571/02* (2013.01); *Y10T 428/2495* (2015.01); *Y10T 428/24942* (2015.01); *Y10T 428/26* (2015.01)

(56) References Cited

U.S. PATENT DOCUMENTS

| | | | |
|---|---|---|---|
| 4,663,228 A | | 5/1987 | Bolton et al. |
| 5,895,768 A | * | 4/1999 | Speit ................ C03C 1/004 428/846.9 |
| 6,921,509 B2 | * | 7/2005 | Moran ................ B32B 17/10 156/244.11 |

FOREIGN PATENT DOCUMENTS

| | | |
|---|---|---|
| DE | 19616679 C1 | 5/1997 |
| DE | 19729336 A1 | 1/1999 |
| DE | 69227344 T2 | 6/1999 |
| DE | 10112859 A1 | 10/2002 |
| DE | 102004062060 B3 | 5/2006 |
| DE | 102006042538 A1 | 3/2008 |
| DE | 102010009585 A1 | 9/2011 |
| DE | 102010013641 A1 | 10/2011 |
| DE | 102008043718 B9 | 5/2012 |
| EP | 0157646 A2 | 10/1985 |
| EP | 0137613 B1 | 4/1988 |
| EP | 0508864 A1 | 10/1992 |
| EP | 2520896 A2 | 11/2012 |
| WO | 03068501 A1 | 8/2003 |

OTHER PUBLICATIONS

"Security Glass & Glazing Guide". Stiles Steel Door + Window Systems, (2010); pp. 1-18.*
"Types of Glass". http://www.cmog.org/article/types-glass, (2011).*
"Guardian SunGuard(R): Technical Guidelines". Guardian Industries Corp, (2011); pp. 1-24.*
English translation of the International Search Report dated Sep. 3, 2013 for corresponding PCT/EP2013/062149, 4 pages.
English translation of the Written Opinion of the International Searching Authority dated Sep. 3, 2013 for corresponding PCT/EP2013/062149, 12 pages.
English translation of the International Preliminary Report on Patentability dated Jan. 6, 2015 for corresponding PCT/EP2013/062149, 13 pages.

* cited by examiner

BULLET RESISTANT LAMINATED GLASS

BACKGROUND OF THE DISCLOSURE

1. Field of the Disclosure

The present disclosure relates to a bullet-resistant laminated glass having at least three sheets of glass in which one of the sheets of glass faces the impact side as a cover sheet, and one glass sheet is formed as a closure sheet facing away from the impact side.

2. Description of the Related Art

Bullet-resistant glass in the form of laminated glass has been known for several decades. It is usually composed of a plurality of glass sheets that are connected to one another with intermediate film layers. These laminated glasses are designed in numerous variations. For example, they are equipped with laminated plastic intermediate layers or with coatings or films that face away from the impact and bind glass splinters. They are also sealed, in part, with a plastic sheet facing away from the impact. Test standards, including the European Standard EN 1063, distinguish between sheets "with splinter output" and sheets "without splinter output" within the individual impact classes. These different classifications require the use of laminated glasses of different thicknesses or different glass designs.

In order to be able to fulfill the requirement of the standard for laminated glass free of splinter output in the architectural field, thick laminated glass must be provided. In particular, clearly greater glass thicknesses are necessary than in a laminated glass which simply protects against bullets. For soft-core bullets, the difference in thickness for sheets "with splinter output" and "without splinter output" amounts to up to 50% within the respective projectile or impact class. Due to the increase in thickness and in weight caused by this, the applicability of laminated glasses is made difficult or is hindered. In particular, special constructions are necessary in part for door, window and frame systems. Due to the greater weight, special fastenings are necessary, for example, hinge structures.

In order to counteract such an undesired increase in weight for laminated glasses "without splinter output", frequently a plastic sheet made of polycarbonate, polymethyl methacrylate or the like, which faces away from the impact, is laminated or glued on. Such a solution is disclosed in EP 0 157 646 or DE 10 2008 043 718.

In addition, laminated glasses are known in which a splinter-binding coating facing away from the impact is introduced onto the laminated glass. Such a design variant is disclosed in DE 692 27 344. Both the plastic sheet that is introduced and the splinter-binding coatings are mechanically sensitive. In particular, they are not scratch-resistant. They cannot be properly cleaned, and can be cleaned only with special cleaning agents. In addition, they are at risk of aging, for example, due to UV irradiation. This is a serious disadvantage for use in the field of architecture.

In order to increase ballistic performance, laminated glasses in which chemically or thermally pre-stressed glasses facing the impact side are used are known from the prior art. These glasses then form a cover layer, which breaks up the penetrating bullet or deforms it. The bullet, in fact, then disrupts the cover sheet. However, the splinter output on the back side cannot be prevented by this measure. Therefore, frequently polycarbonate sheets or the like facing away from the impact are used in these glasses also.

SUMMARY OF THE DISCLOSURE

The present disclosure provides a bullet-resistant laminated glass with low weight, which offers an effective protection from bullets and protection against splinter output.

The present disclosure also provides a bullet-resistant laminated glass that has at least three sheets of glass, which are connected to one another by one or more intermediate composite layers.

The present disclosure further provides that the closure sheet is designed as a thermally or chemically pre-stressed glass sheet.

The present disclosure still further provides a bullet-resistant laminated glass having at least three sheets of glass, in which one of the sheets of glass faces the impact side as a cover sheet, and another glass sheet is formed as a closure sheet facing away from the impact side. There are one or more intermediate sheets disposed between the cover sheet and the closure sheet, and the glass sheets are connected to one another by one or more composite layers that are not composed of polycarbonate, polyurethane or polymethyl methacrylate. Also, in the case of these designs, the closure sheet is formed as a thermally or chemically pre-stressed glass sheet.

The present disclosure yet further provides that with the two above-named solutions for laminated glasses, architectural glasses in particular can be created, which can be produced with low component weights and which are closed on the impact side and also on the back side by glass material.

DETAILED DESCRIPTION OF THE DRAWINGS

DESCRIPTION OF THE EXEMPLARY EMBODIMENTS

Figure 1:
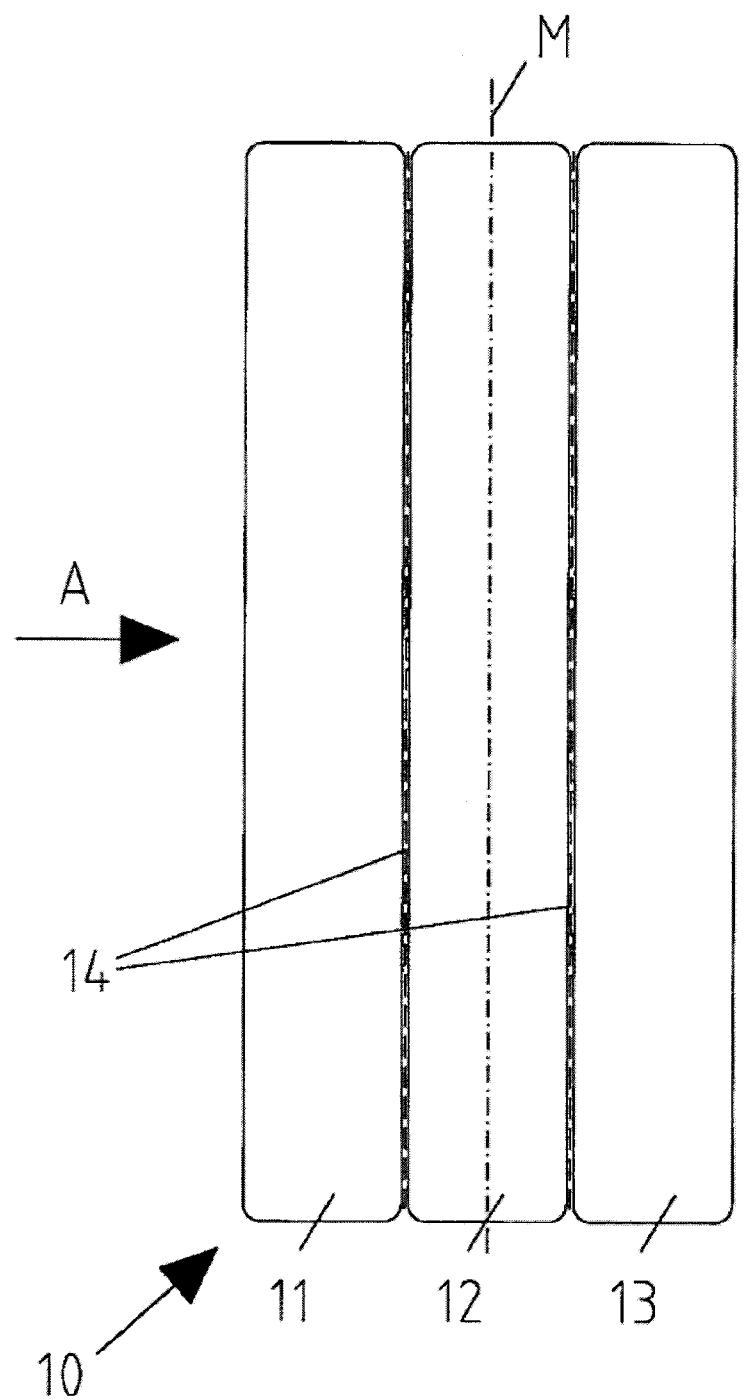
FIG. 1 is a lateral view of a schematic representation of a bullet-resistant laminated glass composed of three glass sheets of the present disclosure.

The present disclosure a bullet-resistant laminated glass that has at least three sheets of glass, which are connected to one another by one or more intermediate composite layers. In this embodiment, the composite layers are formed in the usual way by flexible and dimensionally unstable films and/or cast compounds. Polyvinylbutyral films that have a layer thickness of less than 2 mm are used, in particular, as flexible films. Films composed of other materials are also used, which have a layer thickness of less than 2 mm. Several films also are combined, in part, in order to obtain intermediate layers between two adjacent sheets of glass. Flexible films are characterized by the properties of low modulus of elasticity (<100 MPa) and high deformation (elongation at break>200%) as a consequence of small force and torque loads. These types of flexible and dimensionally unstable films have the advantage that the composite is held together even after the breaking of single, several, or all sheets of glass. Cast compounds are particularly suitable, since the laminated glass can be produced in a simple manner in this way. For example, with composite layers having thicknesses equal to or greater than 1 mm, the individual sheets of glass can be mechanically decoupled.

The closure sheet is designed as a thermally or chemically pre-stressed glass sheet. Further, this glass sheet can therefore enclose the laminated glass facing way from the impact side.

In the case of this construction of a laminated glass, when a projectile impacts it, first the cover sheet and consequently the intermediate sheet(s) adjacent to the cover sheet is (are) broken due to the impact of the projectile. The energy of the projectile in this embodiment is transferred onto the broken sheet(s) and this leads to a shock-like bending load that is taken up by the pre-stressed closure sheet. It has been surprisingly shown that due to the pre-stressing, a break of the closure sheet does not occur. Consequently, there is also no splinter output on the back side. This type of construction of a laminated glass equally also displays a good protection against an explosion effect. In the case of a pressure wave occurring in the region of the impact side, tensile stresses are produced on the closure sheet, which can be effectively broken down as a consequence of the pre-stressing, so that a break in the material does not occur.

The present disclosure includes a bullet-resistant laminated glass having at least three sheets of glass, in which one of the sheets of glass faces the impact side as a cover sheet, and another glass sheet is formed as a closure sheet facing away from the impact side, and one or more intermediate sheets are disposed between the cover sheet and the closure sheet. The glass sheets are connected to one another by composite layers that are not composed of polycarbonate, polyurethane or polymethyl methacrylate. Also, in the case of these design variants, the closure sheet is formed as a thermally or chemically pre-stressed glass sheet.

It has been shown surprisingly that by dispensing with the composite layers that are usually used for bullet-resistant laminated glasses and that are composed of polycarbonate, polyurethane or polymethyl methacrylate, an advantageous effect can be achieved relative to prevention of splinter output on the back side. The energy of the impacting projectile is not influenced by such intermediate layers introduced into the closure sheet, so that the energy of the projectile can be reliably taken up without danger of breaking this closure sheet. Also, a bullet-resistant laminated glass is obtained with this solution without splinter output on the back side.

With the two above-named solutions for laminated glasses, architectural glasses in particular can be created, which can be produced with low component weights and which are closed on the impact side and also on the back side by glass material. Therefore, they can be easily cleaned, and they are resistant to scratching and aging. Costly support structures can be dispensed with due to the low component weight.

It has been shown that an optimized bending load for the closure sheet then occurs if the cover sheet and the intermediate sheet(s) have a greater thickness than the closure sheet.

For the construction of the laminated glass, the glass sheets can be formed by a borosilicate glass, a soda-lime glass, an aluminosilicate glass and/or a lithium aluminosilicate glass. Therefore, recourse can be made to commercially available components. Ideally, all glass sheets are composed of a glass material, preferably of borosilicate glass, which has been shown to be particularly suitable for this application objective and in the case of impact with soft-core bullets. Particularly preferred, the cover sheet should be composed of borosilicate glass in order to effectively break the impact energy of a soft-core bullet.

Especially preferred, the composite layer is formed by one or more films, in particular, composed of polyvinylbutyral. These films can be processed in the autoclaving process and lead to a reliable, large-area connection of the glass sheets lying next to one another. The films essentially guarantee the holding together of the broken glass components after the impact of a projectile.

In order to be able to assure the reliable transfer of the bending load onto the closure sheet upon impact with a projectile, the composite layer should have a thickness of less than 2 mm, in particular a thickness of less than 1 mm. Thicknesses of less than 2 mm assure a high safety against splinter output on the back side. They also form a kind of elastic buffer, which contributes to the purpose of absorbing the energy of an impacting projectile. With thicknesses of less than 1 mm, reliable operating values are still achievable.

In order to fulfill the standard requirements according to DIN EN 1063, the tensile bending strength of the closure sheet should be $\geq 100$ N/mm$^2$. More preferably, the tensile bending strength lies above 140 N/mm$^2$. Then certain manufacturing inaccuracies in the laminated glass are reliably equilibrated and a splinter output on the back side is always prevented. Clearly higher strengths can be obtained with the use of chemically pre-stressed sheets. The latter can be used in order to reduce the sheet thickness of the remaining sheets of the laminated glass in favor of a small overall component weight. For example, pre-stressing in the range between 500 N/mm$^2$ and 1100 N/mm$^2$ can be achieved with chemically pre-stressed glasses. Such chemically pre-stressed glasses are particularly suitable within the scope of the present disclosure.

In the embodiment in which a thermally pre-stressed closure sheet is used, then the latter should have a thickness in the range between 4 and 10 mm, in order to make it sufficiently resistant to bending. In this embodiment, thicknesses of more than 10 mm introduce an improved safety against splinter output on the back side only to a limited extent. However, they significantly increase the weight of the component.

In the embodiment of chemically pre-stressed closure sheets, the thickness should be in the range between 3 and 12 mm. Chemically pre-stressed sheets have the advantage that they can be manufactured with greater pre-stressing and consequently compensate also for greater bending loads. Thus, the layers of glass sheets positioned upstream can be produced with lesser thicknesses, which acts positively on the total weight of the component.

A particularly preferred variant of the present disclosure is configured so that, in the embodiment of the thermally pre-stressed closure sheet, the ratio between the thickness of the closure sheet and the tensile bending strength of the closure sheet is selected in the range between $1:15 \leq x \leq 50$, preferably $1:20 \leq x \leq 30$. In the embodiment of the chemically pre-stressed closure sheet, this ratio should be selected in the range between $1:50 \leq x \leq 1:1000$, preferably $1:100 \leq x \leq 1:200$. These closure sheets are optimized with respect to their weight and tensile bending strength in such a way that the glass sheets positioned upstream can be designed with relatively small thickness. In this way, the overall component weight of the laminated glass can be optimized.

Glass compositions for the closure sheet that are composed as follows have been demonstrated to be particularly suitable:

| Aluminosilicate glass | Composition in mol. % |
|---|---|
| $SiO_2$ | 63-67.5 |
| $B_2O_3$ | 0.0-7.0 |
| $Al_2O_3$ | 10-12.5 |
| $Na_2O$ | 8.5-15.5 |
| $K_2O$ | 0.0-4.0 |
| MgO | 2.0-9.0 |
| CaO + SrO + ZnO | 0-2.5 |
| $TiO_2 + ZrO_2$ | 0.5-1.5 |
| $CeO_2$ | 0.0-0.5 |
| $As_2O_3 + Sb_2O_3$ | 0.0-0.4 |
| $SnO_2$ | 0.05-0.5 |
| F | 0-1 |

Alternatively, glass compositions for the closure sheet that are composed as follows have also been demonstrated as suitable:

| Lithium aluminosilicate glass | Composition in mol. % |
|---|---|
| $SiO_2$ | 60-70 |
| $Al_2O_3$ | 10-13 |
| $B_2O_3$ | 0.0-0.9 |
| $Li_2O$ | 9.6-11.6 |
| $Na_2O$ | 8.2-<10 |
| $K_2O$ | 0.0-0.7 |
| MgO | 0.0-0.2 |
| CaO | 0.2-2.3 |
| ZnO | 0.0-0.4 |
| $ZrO_2$ | 1.3-2.6 |
| $P_2O_5$ | 0.0-0.5 |
| $Fe_2O_3$ | 0.003-0.100 |
| $SnO_2$ | 0.0-1.0 |
| $CeO_2$ | 0.004-0.2 |

In the case of the laminated glass combination according to the present invention, intermediate sheets with a thickness in the range of ≥4 mm have been demonstrated to be particularly suitable for sufficiently breaking the impact of the projectile.

Several examples of embodiment for the bullet-resistant laminated glasses according to the present disclosure are listed below:

Construction 1—Bullet Resistance BR 2 NS According to DIN EN 1063
Component dimensions 1500 mm×1000 mm

| L No. | Thickness | Material |
|---|---|---|
| 1 | 8 mm | Float glass - cover sheet |
| 2 | 2 mm | Cast resin |
| 3 | 5 mm | Float glass - intermediate sheet |
| 4 | 1 mm | Cast resin |
| 5 | 5 mm | Float glass - intermediate sheet |
| 6 | 1 mm | Cast resin |
| 7 | 8 mm | ESG (thermal prestressing ≥100 $N/mm^2$) - closure sheet |

Production of Laminate:
Principle: Cast resin bonding; JenUV-Pleximer JPM-012-05
Process parameters: UV curing at room temperature; 20 minutes
Testing of the bullet resistance class according to EN 1063:
Result: BR 2 NS Construction 2—Bullet Resistance BR 4 NS According to DIN EN 1063
Component dimensions 800 mm×800 mm

| L No. | Thickness | Material |
|---|---|---|
| 1 | 10 mm | Borosilicate glass Boro 33 - cover sheet |
| 2 | 1.52 mm | PVB film |
| 3 | 7 mm | Borosilicate glass Boro 33 - intermediate sheet |
| 4 | 1.52 mm | PVB film |
| 5 | 7 mm | Borosilicate glass Boro 33 - intermediate sheet |
| 6 | 0.76 mm | PVB film |
| 7 | 7 mm | Borosilicate glass Boro 33 - intermediate sheet |
| 8 | 0.76 mm | PVB film |
| 9 | 5 mm | Borosilicate glass Boro 33 - intermediate sheet |
| 10 | 0.76 mm | PVB film |
| 11 | 5 mm | PYRANC ® white (thermal prestressing (≥100 $N/mm^2$) - closure sheet |

Production of Laminate:
Principle: Bag method; autoclave manufacture
Process parameters: Total duration: 8 hrs. Max. temperature: 150° C., Max. pressure, 5 bars
Testing of the bullet resistance class according to EN 1063:
Result: BR 4 NS Construction 3—Bullet Resistance BR 6 NS According to DIN EN 1063
Component dimensions 1000 mm×2200 mm

| L No. | Thickness | Material |
|---|---|---|
| 1 | 4 mm | Borosilicate glass Boro 33 - cover sheet |
| 2 | 1.52 mm | PVB film |
| 3 | 6 mm | Borosilicate glass Boro 33 - intermediate sheet |
| 4 | 0.76 mm | PVB film |
| 5 | 6 mm | Borosilicate glass Boro 33 - intermediate sheet |
| 6 | 0.76 mm | PVB film |
| 7 | 6 mm | Borosilicate glass Boro 40 - intermediate sheet |
| 8 | 0.76 mm | PVB film |
| 9 | 8 mm | Borosilicate glass Boro 40 - intermediate sheet |
| 10 | 0.76 mm | PVB film |
| 11 | 10 mm | Borosilicate glass Boro 40 - intermediate sheet |
| 12 | 0.76 mm | PVB film |
| 13 | 12 mm | Borosilicate glass Boro 40 - intermediate sheet |
| 14 | 0.76 mm | PVB film |
| 15 | 4 mm | LAS 80 (chemical prestressing ≥ 250 $N/mm^2$) - closure sheet |

Production of Laminate:
Principle: Bag method; autoclave manufacture
Process parameters: Total duration: 8 hrs. Max. temperature: 150° C., Max. pressure, 5 bars
Testing of the bullet resistance class according to EN 1063:
Result: BR 6 NS Construction 4—Bullet Resistance BR 2 NS According to DIN EN 1063 and Explosion Resistance ER 4 NS According to DIN EN 13541
Component dimensions 900 mm×1100 mm

| L No. | Thickness | Material |
|---|---|---|
| 1 | 5 mm | Borosilicate glass - cover sheet |
| 2 | 0.38 mm | PVB film |
| 3 | 7.5 mm | Borosilicate glass - intermediate sheet |
| 4 | 0.38 mm | PVB film |
| 5 | 5 mm | Borosilicate glass - intermediate sheet |
| 6 | 0.76 mm | PVB film |
| 7 | 5 mm | PYRAN ® S - closure sheet |

Production of Laminate:
Principle: Bag method; autoclave manufacture
Process parameters: Total duration: 9 hrs. Max. temperature: 145° C., Max. pressure: 5 bars Testing of the bullet resistance class according to EN 1063:
Result: BR 2 NS
Testing of the explosion resistance class according to EN 13541: Result: ER 4 NS
Construction 5—Bullet resistance BR 7 NS according to DIN EN 1063
Component dimensions 500 mm×500 mm

| L No. | Thickness | Material | [%] | [%] | Total |
|---|---|---|---|---|---|
| 1 | 7.5 mm | Borosilicate glass - cover sheet | 11.8 | 11.8 | 100.0 |
| 2 | 0.38 mm | PVB film | 0.6 | 12.4 | 88.2 |
| 3 | 7.5 mm | Borosilicate glass - intermediate sheet | 11.8 | 24.3 | 87.6 |
| 4 | 0.38 mm | PVB film | 0.6 | 24.9 | 75.7 |
| 5 | 7.5 mm | Borosilicate glass - intermediate sheet | 11.8 | 36.7 | 75.1 |
| 6 | 0.76 mm | PVB film | 1.2 | 37.9 | 63.3 |
| 7 | 9 mm | Borosilicate glass - intermediate sheet | 14.2 | 52.1 | 62.1 |
| 8 | 0.38 mm | PVB film | 0.6 | 52.7 | 47.9 |
| 9 | 7.5 mm | Borosilicate glass - intermediate sheet | 11.8 | 64.5 | 47.3 |
| 10 | 0.38 mm | PVB film | 0.6 | 65.1 | 35.5 |
| 11 | 5 mm | Borosilicate glass - intermediate sheet | 7.9 | 73.0 | 34.9 |
| 12 | 0.76 mm | PVB film | 1.2 | 74.2 | 27.0 |
| 13 | 8 mm | AS 87 - intermediate sheet | 12.6 | 86.8 | 25.8 |
| 14 | 0.38 mm | PVB film | 0.6 | 87.4 | 13.2 |
| 15 | 8 mm | AS 87 - closure sheet | 12.6 | 100.0 | 12.6 |
| Total | 63.42 | | 100 | | |

Production of Laminate:
Principle: Bag method; autoclave manufacture
Process duration: Total duration: 8 hrs. Max. temperature: 150° C., Max. pressure: 5 bars
Testing of the bullet resistance class according to EN 1063:
Result: BR 7 NS
Construction 6—Bullet resistance BR 6 NS according to DIN EN 1063
Component dimensions 500 mm×500 mm

| L No. | Thickness | Material | [%] | [%] | Total |
|---|---|---|---|---|---|
| 1 | 9 mm | Borosilicate glass - intermediate sheet | 17.8 | 17.8 | 100.0 |
| 2 | 0.76 mm | PVB film | 1.5 | 19.3 | 82.2 |
| 3 | 9 mm | Borosilicate glass - intermediate sheet | 17.8 | 37.0 | 80.7 |
| 4 | 0.38 mm | PVB film | 0.8 | 37.8 | 63.0 |
| 5 | 9 mm | Borosilicate glass - intermediate sheet | 17.8 | 55.5 | 62.2 |
| 6 | 0.38 mm | PVB film | 0.8 | 56.3 | 44.5 |
| 7 | 8 mm | AS 87 - intermediate sheet | 15.8 | 72.1 | 43.7 |
| 8 | 0.76 mm | PVB film | 1.5 | 73.6 | 27.9 |
| 9 | 8 mm | AS 87 - intermediate sheet | 15.8 | 89.4 | 26.4 |
| 10 | 0.38 mm | PVB film | 0.8 | 90.1 | 10.6 |
| 11 | 5 mm | AS 87 - closure sheet | 9.9 | 100.0 | 9.9 |
| Total | 50.66 | | 100 | | |

Production of Laminate:
Principle: Bag method; autoclave manufacture
Process parameters: Total duration: 8 hrs. Max. temperature: 145° C., Max. pressure: 6 bars
Testing of the bullet resistance class according to EN 1063:
Result: BR 6 NS
In the above-described constructions, a commercially available type of glass is employed as borosilicate glass, as can be obtained, for example, under the trade names BOROFLOAT® 33 and BOROFLOAT® 40 of Schott AG. Chemically pre-stressed types of glass are described, such as AS 87 and LAS 80 that can be obtained under the trade names SCHOTT® AS87 and SCHOTT® LAS80 of Schott AG, and moreover, are also described in claim 14.

PYRAN® S and PYRAN® white are trade names of pre-stressed borosilicate glasses obtainable from Schott AG.

In all of the above-described constructions, the stated borosilicate glasses employed always involve glasses that are not pre-stressed. In particular, the cover sheet is formed by a glass that is not pre-stressed. This has the advantage that in the case of a bullet test according to DIN EN 1063, an impact triangle is formed; the first hit does not greatly splinter the cover sheet. In particular, a splinter pattern that extends into the region where subsequent hits occur does not arise. A high bullet resistance is thus offered in this way.

In the constructions, pre-stressed glasses having a thickness of >4 mm (thermally pre-stressed) or of >3 mm (chemically pre-stressed) are always employed for the closure sheet. Starting from these glass thicknesses, a high resistance against splinter output on the back side is achieved, as can be seen from the preceding tables.

Only one pre-stressed sheet is used (closure sheet) in the constructions 1 to 4.

Constructions 5 and 6 use another pre-stressed intermediate sheet (AS 87—intermediate sheet) adjacent to the pre-stressed closure sheet. In principle, other or all intermediate sheets may also be pre-stressed. Of course, it is advantageous if all pre-stressed intermediate sheets are disposed on the tensile side of the laminated glass. Therefore, they should be disposed behind the mid-point transverse plane of the laminated glass, facing away from the impact side. There, they can optimally decompose bending stresses in the laminated glass when impacted by a projectile. For this reason, the closure sheet should also always be completely disposed behind the mid-point transverse plane in the laminated glasses according to the invention.

The pre-stressed glass parts should thus extend at maximum up to half the total component thickness of the laminated glass. It has been shown that extending the pre-stressed glass parts even up to one-third of the total component thickness offers excellent resistance to bullets and also reliably protects against explosion effects.

The present disclosure will be explained in further detail on the basis of examples of embodiment shown in the drawings.

FIG. 1 is a schematic representation. in lateral view, of a bullet-resistant laminated glass 10, which is composed of three glass sheets, of the present disclosure. In this embodiment, a cover sheet 11 that is backed by an intermediate sheet 12 is provided facing the impact side A, i.e., the side that is subjected to the projectile. A closure sheet 13 is connected to the intermediate sheet 12 on the back side, facing away from the impact side A. These three glass sheets (cover sheet 11, intermediate sheet 12 and closure sheet 13) are connected to one another by one or more composite layers 14. In this embodiment, the composite layers 14 are formed from flexible films, preferably polyvinylbutyral films. The composite layers 14 are heated in the autoclave process and the glass sheets are pressed together under pressure. The glass sheets can be bonded to one another in this way.

Whereas the cover sheet 11 and the intermediate sheet 12 are composed of non-pre-stressed glass, the closure sheet 13 is formed by a thermally or chemically pre-stressed glass material. As recognized in FIG. 1, the side of the closure sheet 13 facing away from the impact side A is neither provided with a coating, nor is it backed by means of a cover layer.

Figure 2:
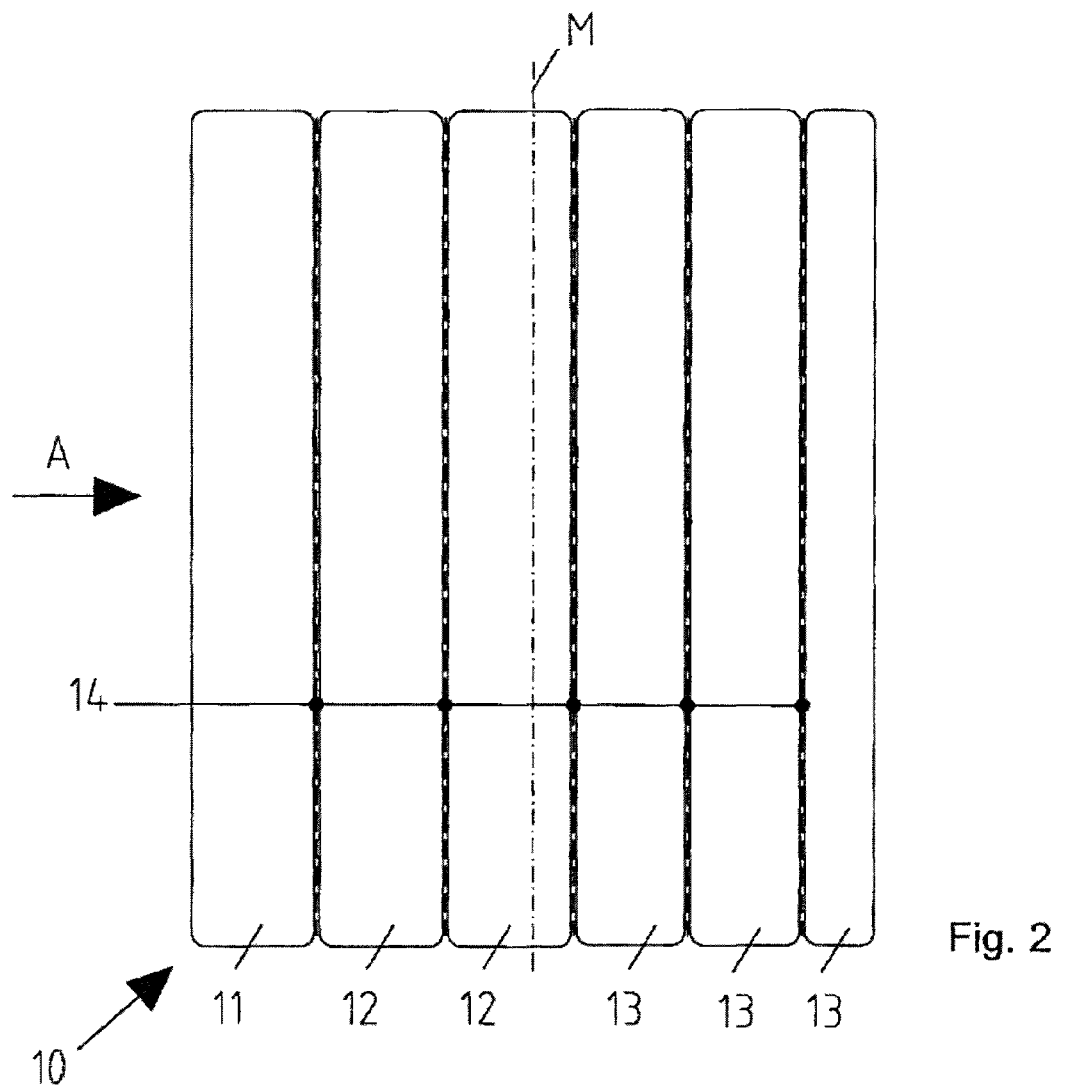
FIG. 2 is a lateral view of a schematic representation of the bullet-resistant laminated glass according to the construction 6 of the present disclosure described herein.

FIG. 2 is a schematic representation, in lateral view, of the bullet-resistant laminated glass according to the construction 5 described above. As can be recognized from this presentation, the two pre-stressed glasses (AS 87) are disposed behind the mid-point transverse plane M, which extends parallel to the two end faces of the laminated glass 10, and face away from the impact side A.

The invention claimed is:

1. A bullet-resistant laminated glass having at least three sheets of glass, wherein one of the glass sheets faces the impact side (A) as a cover sheet, and one glass sheet that faces away from the impact side (A) is formed as a closure sheet, wherein one or more intermediate sheets are disposed between the cover sheet and the closure sheet, wherein the glass sheets are connected to one another by composite layers, which are formed by flexible and dimensionally unstable films and/or cast compounds, and wherein the closure sheet is formed as a thermally or chemically pre-stressed glass sheet, wherein the cover sheet and the one or more intermediate sheets are composed of non-pre-stressed glass, wherein the thermally pre-stressed closure sheet is selected and has the ratio (x) between the thickness of the closure sheet and the tensile bending strength of the closure sheet in the range between 1:15≤x≤1:50, or wherein the chemically pre-stressed closure sheet is selected and has the ratio (x) between the thickness of the closure sheet and a tensile bending strength of the closure sheet in the range between 1:50≤x≤1:1000, and wherein the closure sheet has a thickness in the range of 4 to 10 mm.

2. The bullet-resistant laminated glass according to claim 1, further comprising that the closure sheet has a glass material that closes the bullet-resistant laminated glass and no foil and/or film is applied on the outside onto the closure sheet.

3. The bullet-resistant laminated glass according to claim 1, wherein the cover sheet and at least one intermediate sheet have a greater thickness than the closure sheet.

4. The bullet-resistant laminated glass according to claim 1, wherein the cover sheet, intermediate sheet, and closure sheet are formed by a glass selected from the group consisting of a borosilicate glass, a soda-lime glass, an aluminosilicate glass, a lithium aluminosilicate glass, and any combination thereof.

5. The bullet-resistant laminated glass according to claim 1, wherein at least one composite layer is formed by one or more films.

6. The bullet-resistant laminated glass according to claim 1, wherein at least one composite layer has a thickness of less than 2 mm.

7. The bullet-resistant laminated glass according to claim 1, wherein the closure sheet has a tensile bending strength that is 100 N/mm$^2$.

8. The bullet-resistant laminated glass according to claim 1 has a glass composition (mol %) of the closure sheet is selected as follows:

| Aluminosilicate glass | |
|---|---|
| SiO$_2$ | 63-67.5 |
| B$_2$O$_3$ | 0.0-7.0 |
| Al$_2$O$_3$ | 10-14.0 |
| Na$_2$O | 8.5-15.5 |
| K$_2$O | 0.0-4.0 |

| Aluminosilicate glass | |
|---|---|
| MgO | 0-9.0 |
| CaO + SrO + ZnO | 0-2.5 |
| TiO$_2$ + ZrO$_2$ | 0-1.5 |
| CeO$_2$ | 0.0-0.5 |
| As$_2$O$_3$ + Sb$_2$O$_3$ | 0.0-0.4 |
| SnO$_2$ | 0.05-0.5 |
| F | 0.0-1.0. |

9. The bullet-resistant laminated glass according to claim 1, wherein one of the one or more intermediate sheets has a thickness in the range of ≥4 mm.

10. The bullet-resistant laminated glass according to claim 1, further comprising at least one more intermediate sheet that is formed as a thermally or chemically pre-stressed glass sheet.

11. The bullet-resistant laminated glass according to claim 10, wherein the closure sheet and/or all other thermally and/or chemically pre-stressed intermediate sheets are disposed behind the mid-point plane of the laminated glass, facing away from the impact side (A), and are disposed parallel to the two end faces formed by the cover sheet and the closure sheet.

12. The bullet-resistant laminated glass according to claim 10, wherein the closure sheet, the thermally and/or chemically pre-stressed one or more intermediate sheets and the composite layers have a total thicknesses that is less than or equal to half the total thickness of the laminated glass.

13. The bullet-resistant laminated glass according to claim 1, wherein the cover sheet and/or at least one of the one or more intermediate sheets is disposed in front of the mid-point transverse plane facing the impact side (A) and is formed by a non-pre-stressed glass material or a glass ceramic or the cover sheet and all of the one or more intermediate sheets are formed by a non-pre-stressed glass material or a glass ceramic.

14. The bullet-resistant laminated glass according to claim 1 has a glass composition (mol %) of the closure sheet is selected with the following molar ratios:

| | |
|---|---|
| SiO$_2$/Al$_2$O$_3$ | 5.0-6.8 |
| Na$_2$O/K$_2$O | 2.1-12.0 |
| Al$_2$O$_3$/K$_2$O | 2.5-12.0 |
| Al$_2$O$_3$/Na$_2$O | 0.6-1.5 |
| (Na$_2$O + K$_2$O)/(MgO + CaO + SrO) | 0.95-6.5. |

15. A bullet-resistant laminated glass having at least three sheets of glass, wherein one of the glass sheets faces the impact side (A) as a cover sheet, and one glass sheet that faces away from the impact side (A) is formed as a closure sheet, wherein one or more intermediate sheets are disposed between the cover sheet and the closure sheet, wherein the glass sheets are connected to one another by composite layers that are not composed of polycarbonate, polyurethane or polymethyl methacrylate, and wherein the closure sheet is formed as a thermally or chemically pre-stressed glass sheet, wherein the cover sheet is composed of non-pre-stressed glass and wherein the pre-stressed glass sheet extends at maximum up to half the total thickness of the laminated glass, wherein the thermally pre-stressed closure sheet is selected and has the ratio (x) between the thickness of the closure sheet and the tensile bending strength of the closure sheet in the range between 1:15≤x≤1:50, or wherein the chemically pre-stressed closure sheet is selected and has the ratio (x) between the thickness of the closure sheet and a tensile bending strength of the closure sheet in the range between $1:50 \leq x \leq 1:1000$, and wherein the closure sheet has a thickness in the range of 4 to 10 mm.

16. The bullet-resistant laminated glass according to claim 15, further comprising the closure sheet has a glass material that closes the bullet-resistant laminated glass and no foil and/or film is applied on the outside onto the closure sheet.

17. The bullet-resistant laminated glass according to claim 15, wherein the cover sheet and at least one intermediate sheet have a greater thickness than the closure sheet.

18. The bullet-resistant laminated glass according to claim 15, wherein the cover sheet, intermediate sheet, and closure sheet are formed by a glass selected from the group consisting of a borosilicate glass, a soda-lime glass, an aluminosilicate glass, a lithium aluminosilicate glass, and any combination thereof.

* * * * *